United States Patent
Jiang et al.

(10) Patent No.: US 12,335,830 B1
(45) Date of Patent: Jun. 17, 2025

(54) DETECTING AND CONTROLLING DIFFERENT TYPES OF ZIGBEE DEVICES ON DIFFERENT NETWORKS AND CHANNELS

(71) Applicant: Amazon Technologies, Inc., Seattle, WA (US)

(72) Inventors: Tao Jiang, Milpitas, CA (US); Hans Edward Birch-Jensen, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 17/892,774

(22) Filed: Aug. 22, 2022

(51) Int. Cl.
*H04W 4/80* (2018.01)
*H04W 4/06* (2009.01)
*H04W 12/0433* (2021.01)
*H04W 76/11* (2018.01)

(52) U.S. Cl.
CPC ............... *H04W 4/80* (2018.02); *H04W 4/06* (2013.01); *H04W 12/0433* (2021.01); *H04W 76/11* (2018.02)

(58) Field of Classification Search
CPC ..... H04W 76/22; H04W 36/12; H04W 36/38; H04W 76/10; H04W 76/11; H04W 36/00; H04W 36/0011; H04W 52/0225; H04W 52/0216; H04W 52/02; Y02D 30/70
See application file for complete search history.

(56) References Cited

U.S. PATENT DOCUMENTS

| | | | |
|---|---|---|---|
| 8,355,363 B2 * | 1/2013 | Brahmbhatt | H04L 63/06 455/448 |
| 9,125,237 B2 * | 9/2015 | Goto | H04W 84/20 |
| 11,477,654 B1 * | 10/2022 | Kahn | H04W 12/069 |
| 11,564,266 B1 * | 1/2023 | Kahn | H04W 76/10 |
| 2012/0124367 A1 * | 5/2012 | Ota | H04W 12/0431 713/153 |
| 2014/0105066 A1 * | 4/2014 | Erdmann | H04L 41/12 370/254 |
| 2016/0248629 A1 * | 8/2016 | Erdmann | H04L 41/0859 |
| 2017/0156076 A1 * | 6/2017 | Eom | H04W 24/10 |
| 2018/0006723 A1 * | 1/2018 | Noh | H04W 76/15 |
| 2019/0347916 A1 * | 11/2019 | Wild | H04L 67/1095 |

(Continued)

FOREIGN PATENT DOCUMENTS

EP 4231500 A1 * 8/2023 ............. H02J 50/10

*Primary Examiner* — Nathan S Taylor
(74) *Attorney, Agent, or Firm* — Lowenstein Sandler LLP

(57) ABSTRACT

Technologies directed to detecting and controlling different types of ZigBee devices on different ZigBee networks reliably and efficiently. In one method of operating a first device, the method includes detecting first and second Zigbee networks. The method sends a first request to rejoin the first Zigbee network, the first request being encoded with the first network key. While rejoined as part of the first Zigbee network, the method detects a first set of devices part of the first Zigbee network. The method repeats this for a second set of devices part of the second Zigbee network. The method determines, using the device data, a subset of controllable devices located in proximity, and sends a message with the command to each in response to receiving a command. Each message is encoded with a respective network key and a respective link key specified in the device data.

20 Claims, 8 Drawing Sheets

(56) References Cited

U.S. PATENT DOCUMENTS

| | | | | |
|---|---|---|---|---|
| 2019/0349426 | A1* | 11/2019 | Smith | H04L 41/0806 |
| 2020/0404077 | A1* | 12/2020 | Jiang | G06V 40/20 |
| 2021/0377255 | A1* | 12/2021 | Schmidt | H04L 9/30 |
| 2023/0180100 | A1* | 6/2023 | Haverlag | H04W 40/22 |
| | | | | 370/329 |
| 2023/0232231 | A1* | 7/2023 | Deixler | H04W 12/55 |
| | | | | 455/410 |

* cited by examiner

| Pan ID | extPanID | Channel ID | NWK FRAME Counter | NWK KEY | LINK KEY | Name |
|---|---|---|---|---|---|---|
| 0x1111 | extPanId-1 | 11 | Nwk frame counter -1 | nwk-key-1 | Link-key-1 | Smarthome-1 |
| 0x2222 | extPanId-2 | 16 | Nwk frame counter -2 | nwk-key-2 | Link-key-2 | Smarthome-2 |

FIG. 4

DETECTING AND CONTROLLING DIFFERENT TYPES OF ZIGBEE DEVICES ON DIFFERENT NETWORKS AND CHANNELS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4 illustrates a network list table according to at least one embodiment.

DETAILED DESCRIPTION

Figure 1:
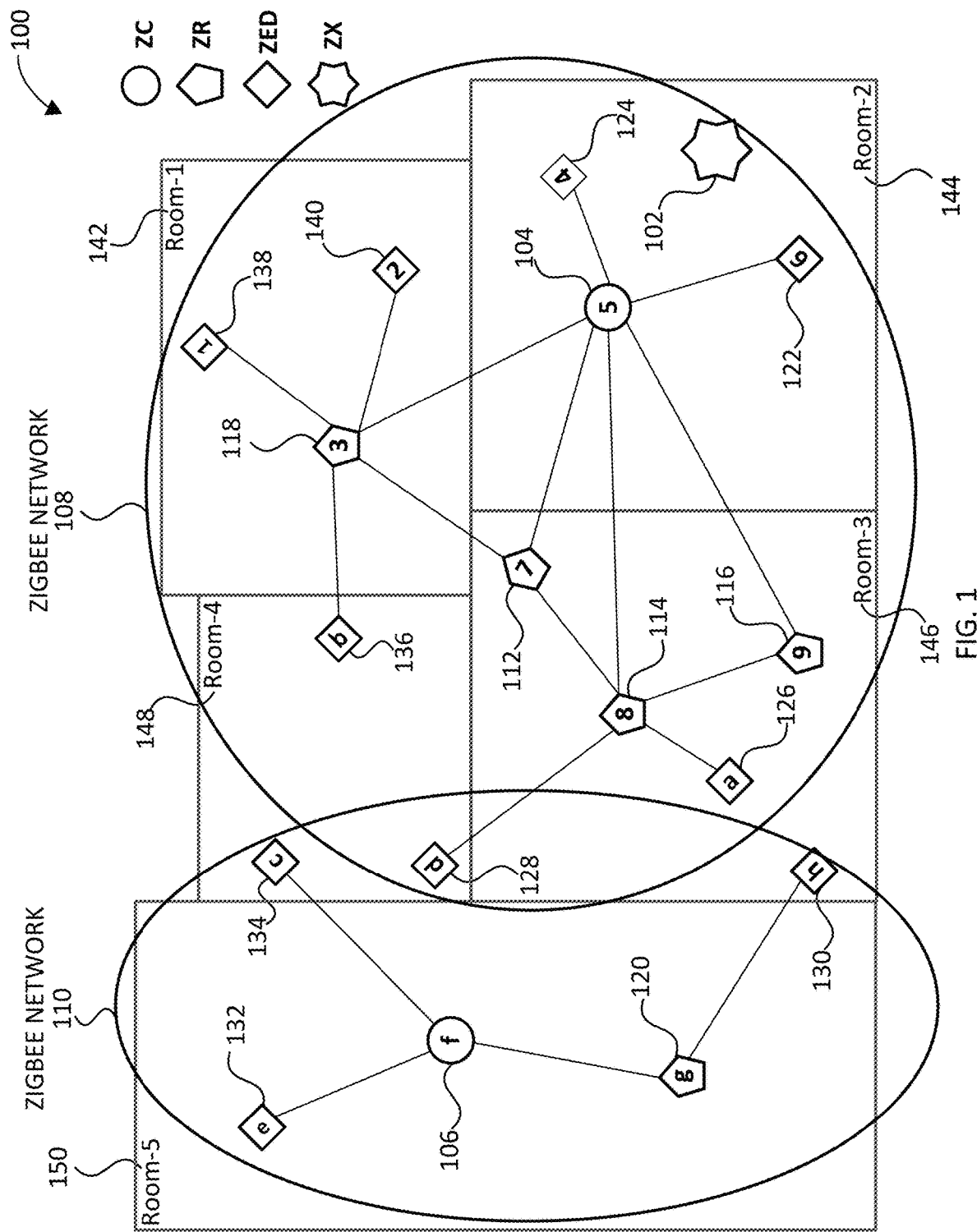
FIG. 1 is a network diagram of a controller device to detect and control multiple Zigbee devices in multiple Zigbee networks in a dwelling according to at least one embodiment.

Technologies directed to discovering and controlling multiple Zigbee devices in different Zigbee networks reliably and efficiently are described. The 2.4 GHz and 5 GHz industrial, scientific, and medical (ISM) radio bands allow unlicensed wireless communications. Due to its unlicensed nature, many short-ranged, low-power wireless communication systems operate in these frequency bands. As such, there is a limited de-license spectrum in various locations (e.g., 2.4 GHz ISM and 5 GHz U-NII bands). Various devices are described herein, including personal area network (PAN) radios that operate in the 2.4 GHz bands and utilize various PAN protocols, such as Bluetooth® Low Energy (BLE), Zigbee, Z-wave, or the like.

The Zigbee technology® is a popular wireless standard established in 2004 and has evolved all over these years from Zigbee1.0 to ZigBee Pro to today's Zigbee 3.0. The Zigbee technology® has transitioned from primary business usage cases to smart home usage cases. Zigbee 3.0 significantly improves security and brings the various Zigbee environments into one unified standard to meet the fast-growing smart home market demand. Because of its simplicity, low cost, low power, flexibility, maturity, and security, Zigbee technology® has become one of the most important and widespread wireless mesh standards for the Internet of Things (IoT) industry.

The Zigbee specification, developed by the Zigbee Alliance, defines three types of ZigBee nodes: ZigBee coordinator (ZC), ZigBee router (ZR), and ZigBee end device (ZED). All these roles are only valid when they are on a ZigBee network. The Zigbee stack will restrict the behavior of each type of node and force them either join the Zigbee network or leave the Zigbee network. A ZR and ZED cannot join multiple ZigBee networks, and the ZC cannot host multiple ZigBee networks. This nature of ZigBee specification brings a challenge to smart home developers in providing feature support for ad-hoc roaming and controlling devices on multiple Zigbee networks. Conventional controller devices cannot join multiple networks and are unable to reliably and quickly switch among different Zigbee networks. Conventional approaches require a device to forget one Zigbee network before joining another Zigbee network, and thus cannot switch and roam between multiple Zigbee networks. Conventional controller devices using the Zigbee standard cannot provide robust and efficient ways of detecting the presence of different types of nearby Zigbee devices and Zigbee networks in order to selectively control devices on-demand.

Aspects and embodiments of the present disclosure address the above and other deficiencies by providing a controller device that reliably and quickly detects the presence of different types of nearby Zigbee devices and Zigbee networks in order to selectively control devices on-demand. Aspects and embodiments of the present disclosure present methods to detect and control different types of ZigBee devices on different ZigBee networks reliably and efficiently. Aspects and embodiments of the present disclosure can detect and control different brands of ZigBee devices in different use cases. Aspects and embodiments of the present disclosure can be used in multiprotocol smart home wearable products to support a fast on-demand smart-things controlling in different environments. Devices described herein can comply with Zigbee HA, Zigbee 3.0 standard, or the like. Aspects and embodiments of the present disclosure can be implemented with minimum modifications to the controller-side Zigbee stack and reduce software engineering efforts. Aspects and embodiments of the present disclosure can adapt to the security changes and topology changes on the Zigbee mesh network and maintain maximum flexibility and stability in the long term. Devices using the aspects and embodiments of the present disclosure can pass the Zigbee certification.

FIG. 1 is a network diagram of a Zigbee controller device 102 to detect and control multiple Zigbee devices in multiple Zigbee networks in a dwelling 100 according to at least one embodiment. The dwelling 100 can be a smart home with multiple Zigbee devices and multiple Zigbee networks located in multiple rooms of the dwelling 100. The Zigbee controller device 102 is a Zigbee controller (ZX) and is of the ZED type. The Zigbee controller device 102 can be a wearable device, such as a smartwatch, a fitness tracker, or the like. In other embodiments, the Zigbee controller device 102 can be other types of portable devices, such as a TV remote controller, a handheld device, or the like. The Zigbee controller device 102 can be a wall-powered device or a battery-power device. A user can wear the Zigbee controller device 102 and use the Zigbee controller device 102 to control Zigbee devices (e.g., Zigbee lightbulbs, Zigbee switches, or the like) in multiple rooms, such as the five rooms of dwelling 100. The dwelling includes a first room 142, a second room 144, a third room 146, a fourth room 148, and a fifth room 150.

As described above, there are three Zigbee node types: ZC, ZR, and ZED. Dwelling 100 includes two ZCs, including Zigbee coordinator 104 located in room 144 and Zigbee coordinator 106 located in room 150. The Zigbee coordinator 104 creates a first Zigbee Network 108. The Zigbee coordinator 106 creates a second Zigbee network 110. The Zigbee coordinators 104 and 106 can be electronic devices with sufficient computing and memory resources for managing the Zigbee network. These devices are typically plugged into power sources. In at least one embodiment, the Zigbee coordinators 104 and 106 are Echo devices, developed by Amazon Technologies, Inc. In at least one embodiment, the Zigbee coordinators 104 and 106 are smart home hubs. Alternatively, the Zigbee coordinators 104 and 106 can be other types of devices in dwelling 100.

The dwelling 100 includes five ZRs, including Zigbee router 112, Zigbee router 114, Zigbee router 116, Zigbee router 120, and Zigbee routers 118. The Zigbee router 112, Zigbee router 114, Zigbee router 116, located in room 146, and Zigbee router 118, located in room 142, are part of the first Zigbee Network 108. The Zigbee router 120, located in room 150, is part of the second Zigbee network 110. The Zigbee routers 112-120 can be smart lightbulbs that operate in the role of ZR, such as Phillips Hue Light bulbs. Alternatively, the Zigbee routers 112-120 can be other IoT devices or other electronic devices that operate in the role of ZR in the Zigbee Networks 108 and 110. The dwelling 100 includes ten ZEDs, including Zigbee end devices 122-140 located in rooms 142-150. The Zigbee end devices 122-140 can be smart lightbulbs that operate in the role of ZED, such as Sengled lightbulbs. Alternatively, the Zigbee end devices 122-140 can be other IoT devices or other electronic devices that operate in the role of ZED in the Zigbee Networks 108 and 110. As described herein, the Zigbee devices can be organized in a mesh network, where not all ZEDs have to be directly connected to the ZCs. An example of ZigBee mesh network topology is shown in FIG. 1.

As illustrated in FIG. 1, the nodes can be organized logically in a cascaded star topology. In the cascaded star topology, a ZC node can provide services to downstream nodes, ZRs, and ZEDs as first-tier links. Downstream ZR nodes can provide service to additional downstream ZR and ZED nodes as second-tier links with respect to downstream nodes. Downstream ZR nodes can provide service to additional downstream ZR and ZED nodes as third-tier links. The cascaded star topology is a configuration of a star network that can use hubs on spokes of the star network to expand or cascade the network into additional star networks. Alternatively, the nodes can be organized in other multi-star networks or other chained interface configurations.

Each wireless device in FIG. 1 is considered a Zigbee device because it has a Zigbee Device Object (ZDO) and a Zigbee Device Profile (ZDP). ZDO is an application running on every ZigBee device. This application, ZDO, keeps track of a state of the ZigBee device on and off the Zigbee network. The ZDO can be a local state machine that controls the state of the Zigbee node on and off the Zigbee network. The ZDO provides an interface to the ZDP, which is a specialized application profile for discovering, configuring, and maintaining ZigBee devices and services on the Zigbee network. ZDP contains a set of commands for discovering various aspects about nodes in the network. Each ZDP request in the Zigbee stack requires a destination address, which may be unicast or broadcast, as the ZigBee specification allows. ZDP also contains a variety of standard services for querying the applications within those nodes. Binding provides a mechanism for attaching an endpoint on one node to one or more endpoints on another node. The ZDP Management services are really handy optional services used for reading the various tables contained within ZigBee nodes, and requesting certain common actions. When a Zigbee node boots up, it does not necessarily join a Zigbee network immediately. It may go into low-power mode and wait for a button-press, or some other event, that causes the Zigbee node to decide that it needs to connect to the Zigbee network. The ZigBee specification provides no low-power application programming interface (API). Zigbee end devices are the only nodes in a ZigBee network that achieve long battery life. In at least one embodiment, the Zigbee stack of the Zigbee devices in FIG. 1 can include a network backup and restore feature to store device information and location information in persistent memory. In at least one embodiment, the Zigbee stack of the Zigbee devices in FIG. 1 can include features for beacon requests and beacon responses, as described in more detail below with respect to FIG. 3. In at least one embodiment, the Zigbee stack of the Zigbee devices in FIG. 1 can include a sniffing mode feature as described herein.

As illustrated in FIG. 1, the Zigbee controller device 102 can detect the first Zigbee Networks 108 and 110, the Zigbee routers 112-120, and the Zigbee end devices 122-140. In some cases, the ZEDs are children of the ZCs, such as illustrated by Zigbee end devices 122 and 124 that are children nodes of Zigbee coordinator 104 in room 144. In other cases, the ZEDs are children of ZRs, such as illustrated by Zigbee end devices 138 and 140 that are children nodes of Zigbee router 118 in room 142.

During operation, an application on the Zigbee controller device 102 can receive a user command to control one or more Zigbee devices in proximity. The Zigbee controller device 102 can detect the first Zigbee Network 108 and the second Zigbee network 110 using beacon requests and beacon responses in a network discovery process, as described in more detail below with respect to FIG. 3.

As part of the network discovery process, the Zigbee controller device 102 can generate a network list table, such as illustrated in FIG. 4, for use in a device discovery process performed for each of the Zigbee networks detected in the network discovery process. In the device discovery process, the Zigbee controller device 102 can send, on a first channel associated with a first channel identifier as specified in the network list table, a first request to rejoin the first Zigbee Network 108. The first request can be a rejoin request or a secure rejoin request since the Zigbee controller device 102 can already have the network credentials (e.g., network frame counter, network key, link key) for the first Zigbee Network 108. For example, the first request can be encoded with a first network key stored in the network list table. While rejoined as part of the first Zigbee network, the Zigbee controller device 102 can detect a first set of one or more devices part of the first Zigbee Network 108. The Zigbee controller device 102 can detect the first set of one or more devices by sending match descriptor requests and receiving match descriptor responses from each of the devices in the first Zigbee network. The Zigbee controller device 102 can send, on a second channel associated with the second channel identifier as specified in the network list table, a second request to rejoin the second Zigbee network 110. The second request can be a rejoin request or a secure rejoin request since the Zigbee controller device 102 can already have the network credentials (e.g., network frame counter, network key, link key) for the second Zigbee Network 110. For example, the second request can be encoded with a second network key specified in the network list table. While rejoined as part of the second Zigbee network 110, the Zigbee controller device 102 can detect a second set of one or more devices part of the second Zigbee network 110.

Figure 5:
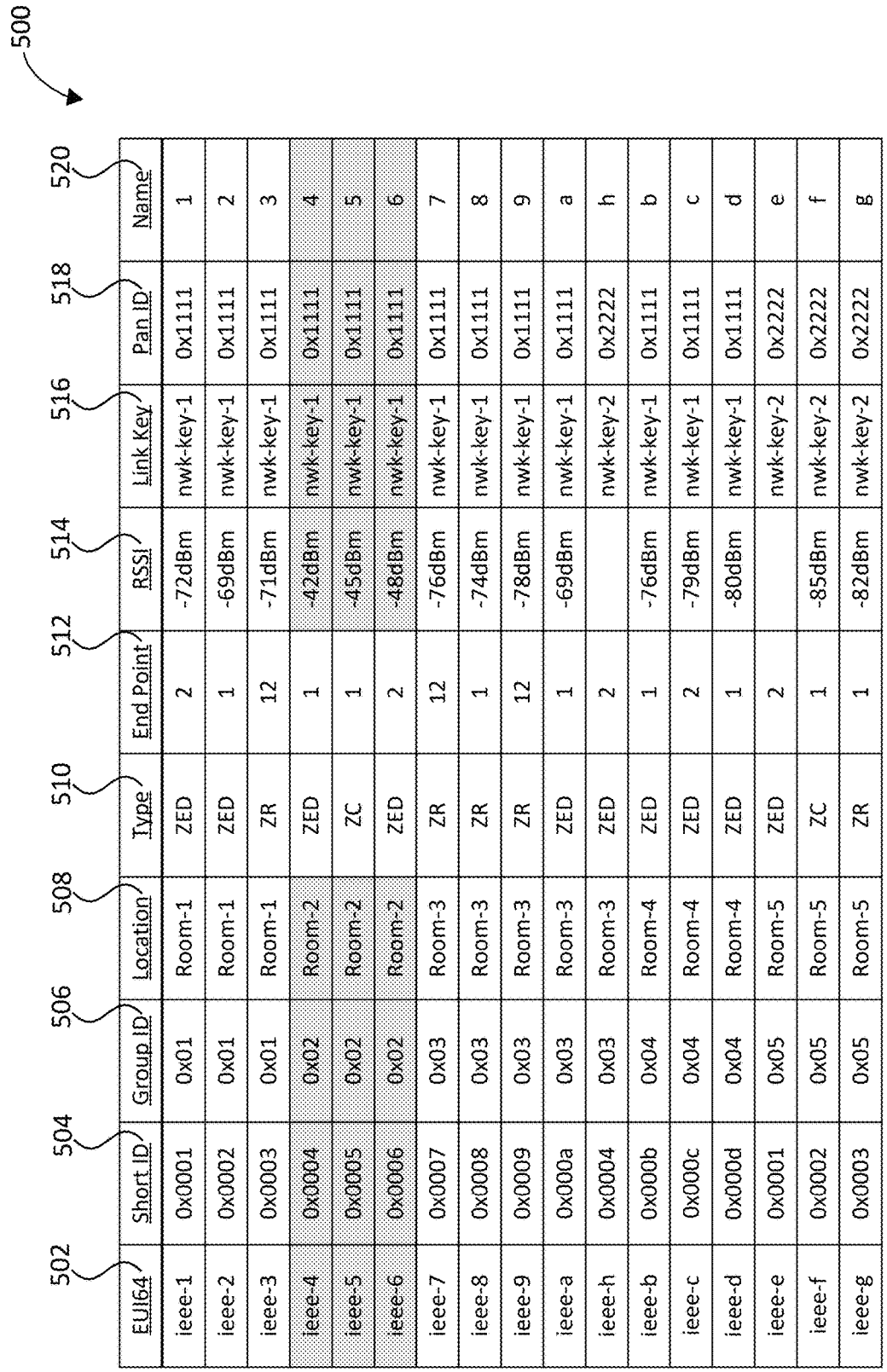
FIG. 5 illustrates a device list table according to at least one embodiment.

As part of the device discovery process, the Zigbee controller device 102 can store device data (also referred to as device information) obtained from other devices in the Zigbee Networks 108 and 110. The device data can be stored in a device list table, such as illustrated in FIG. 5, used by the Zigbee controller device 102 for controlling the Zigbee devices in proximity to the Zigbee controller device 102, as described in more detail below with respect to FIG. 3. In at least one embodiment, the device data includes i) a first network identifier, a first channel identifier, a first network key, and a first link key for each of the first set of one or more devices part of the first Zigbee Network 108, and ii) a second network identifier, a second channel identifier, a second network key, and a second link key for each of the second set of one or more devices part of the second Zigbee network. The Zigbee controller device 102 can determine, using the device data, a subset of devices controllable by the first device, where the subset of devices is located in proximity to the first device. For example, the subset of devices can be the Zigbee devices located in the same room as the Zigbee controller device 102, namely Zigbee coordinator 104, Zigbee end device 122, and Zigbee end device 124 located in room 144. If the Zigbee controller device 102 were located in room 146, the Zigbee controller device 102 can control Zigbee router 112, Zigbee router 114, Zigbee router 116, Zigbee end device 126 of the first Zigbee Network 108, and Zigbee end device 130 of the second Zigbee network 110.

After the network discovery process and the device discovery process, the Zigbee controller device 102 can receive a command to control one or more devices in proximity to the Zigbee controller device 102, such as Zigbee coordinator 104, Zigbee end device 122, and Zigbee end device 124. The Zigbee controller device 102 can send a message to each of the subset of devices, where each message is encoded with a respective network key and a respective link key specified in the device data. In some cases, the message can be encoded with only a network key. The message can contain a network frame counter.

In one use case, the ZEDs are one type of light blubs, manufactured by a first vendor, and the ZRs are another type of lightbulb, manufactured by a second vendor. The Zigbee controller device 102 can detect and control the first and second types of lightbulbs in both topologies. The Zigbee controller device 102 can send a command to the ZC, such as a command to power off the device. In another use case, the Zigbee controller device 102 can power off one of the ZRs while controlling a ZED connected to the one ZR. The Zigbee controller device 102 can reliably detect one or more Zigbee networks and one or more Zigbee devices in each of the one or more Zigbee networks. Once detected, the Zigbee controller device 102 can use information collected during the discovery of the Zigbee devices and Zigbee networks to reliably control the Zigbee devices accordingly, despite being different Zigbee devices on different Zigbee networks.

In at least one embodiment, the Zigbee controller device 102 can obtain some device information from a database storing information about the Zigbee Networks 108 and 110, such as from a device in the Zigbee network (e.g., from one of the ZCs), a cloud service, or a cloud system. The Zigbee controller device 102 can obtain credentials of the Zigbee Networks 108 and 110, such as from a device in the Zigbee network (e.g., from one of the ZCs), a cloud service, or a cloud system. In at least one embodiment, the Zigbee controller device 102 can have the Zigbee radio resources off until needed to control a Zigbee device in order to save power. In response to a command to control a Zigbee device, the Zigbee controller device 102 can use the device information, as illustrated in FIG. 5, to control a subset of the Zigbee devices previously discovered.

In at least one embodiment, the Zigbee controller device 102 can detect all available networks in all channels (e.g., channel 11 to channel 26). The Zigbee controller device 102 can detect all types of Zigbee devices (e.g., ZC, ZR, and ZED). The Zigbee controller device 102 can select any detected Zigbee device and control it (e.g., toggle light). The Zigbee controller device 102 can discover Zigbee devices that are not already in the database and control them as well as Zigbee devices already in the database. In at least one embodiment, the Zigbee controller device 102 can maintain synchronization with the network on the database and credentials over time.

In another embodiment, the Zigbee controller device 102 can detect a first Zigbee network and a second Zigbee network. The Zigbee controller device 102 can join the first Zigbee network on a first channel using a first network key stored by the first device. The Zigbee controller device 102, upon joining the first Zigbee network, can detect a first set of devices that are part of the first Zigbee network. The Zigbee controller device 102 can join the second Zigbee network on a second channel using a second network key stored by the second device. The Zigbee controller device 102, upon joining the second Zigbee network, can detect a second set of devices that are part of the second Zigbee network. The Zigbee controller device 102 can store first device data and second device data. The first device data can include, for each of the first set of devices, a first network identifier, a first channel identifier associated with the first channel, the first network key, and a first link key. The second device data can include, for each of the second set of devices, a second network identifier, a second channel identifier associated with the second channel, the second network key, and a second link key. The Zigbee controller device 102 can determine, using the first and second device data, a subset of devices from the first set and second set of devices controllable by the first device. The Zigbee controller device 102 can receive a command to control the subset of devices. The Zigbee controller device 102 can send a message to each of the subset of devices. Each message can include the command and can be encoded with a respective network key and a respective link key specified in the first device data or the second device data.

In a further embodiment, the first device data can include group information for each of the first set of devices and group information for each of the second set of devices. The Zigbee controller device 102 can determine the subset of devices by identifying, from the first and second device data, the subset of devices from the first set and the second set of devices having the same group information.

In a further embodiment, the Zigbee controller device 102 can determine the subset of devices by i) determining a RSSI value associated with each device of the first set and second set, the RSSI value being indicative of a physical distance between the respective device and the first device, and ii) identifying, from the first and second device data, the subset of devices having an RSSI value that is greater than a specified threshold that represents a threshold physical distance from the first device. It should be noted that the match descriptor responses can be routed multiple times, so it can more than just two sets.

In a further embodiment, the Zigbee controller device 102 can detect the first Zigbee network and the second Zigbee network by sending beacon requests on a set of channels and receiving beacon responses from one or more devices. The Zigbee controller device 102 can generate a network list table using data from the beacon responses. The network list table can specify: i) for the first Zigbee network, the first network identifier, the first channel identifier, a first network frame counter, and the first network key; and ii) for the second Zigbee network, the second network identifier, the second channel identifier, a second network frame counter, and the second network key, In at least one embodiment, the first device joins the first Zigbee network using the first network key and joins the second Zigbee network using the second network key.

In another embodiment, the Zigbee controller device 102 can detect the first set of devices that are part of the first Zigbee network by broadcasting a third request to discover all devices that match specified criteria in the first Zigbee network. The Zigbee controller device 102 can detect the second set of devices that are part of the second Zigbee network by broadcasting a fourth request to discover all devices that match the specified criteria in the second Zigbee network. In at least one embodiment, the specified criteria can include a profile identifier and a cluster identifier. In another embodiment, the specified criteria can include a cluster identifier only.

In at least one embodiment, the Zigbee controller device 102 can receive a response from each of the devices that match the specified criteria in the first Zigbee network in response to the third request. The response can be encrypted with the first link key. The Zigbee controller device 102 can receive a response from each of the devices that match the specified criteria in the second Zigbee network in response to the fourth request. The response can include the second link key. The Zigbee controller device 102 can generate a device list table can include the first and second device data using the responses to the third and fourth requests. The device list table can specify for each of the devices that match the specified criteria a device identifier, the first network key or the second network key, and the first link key or the second link key.

In at least one embodiment, the Zigbee controller device 102 can retrieve, from a database, group information for the first and second sets of devices. The Zigbee controller device 102 can store the group information as part of the first and second device data. The Zigbee controller device 102 can determine the subset of devices using the group information. In another embodiment, the Zigbee controller device 102 can use the group information and the RSSI values that are greater than the specified threshold. As described herein, the subset of devices can include at least one of a Zigbee coordinator, a Zigbee router, or a Zigbee end device.

As described above, the Zigbee devices, including the Zigbee controller device 102, can be compliant with Zigbee HA, Zigbee 3.0 standard, or the like. The embodiments of the Zigbee controller device 102 described herein can be implemented with minimum modifications to the Zigbee stack, reducing software engineering efforts. The Zigbee controller device 102 can adapt to the security changes and topology changes on the Zigbee mesh networks and maintain maximum flexibility and stability in the long term. The Zigbee controller device 102 can pass the Zigbee certification.

Figure 2:
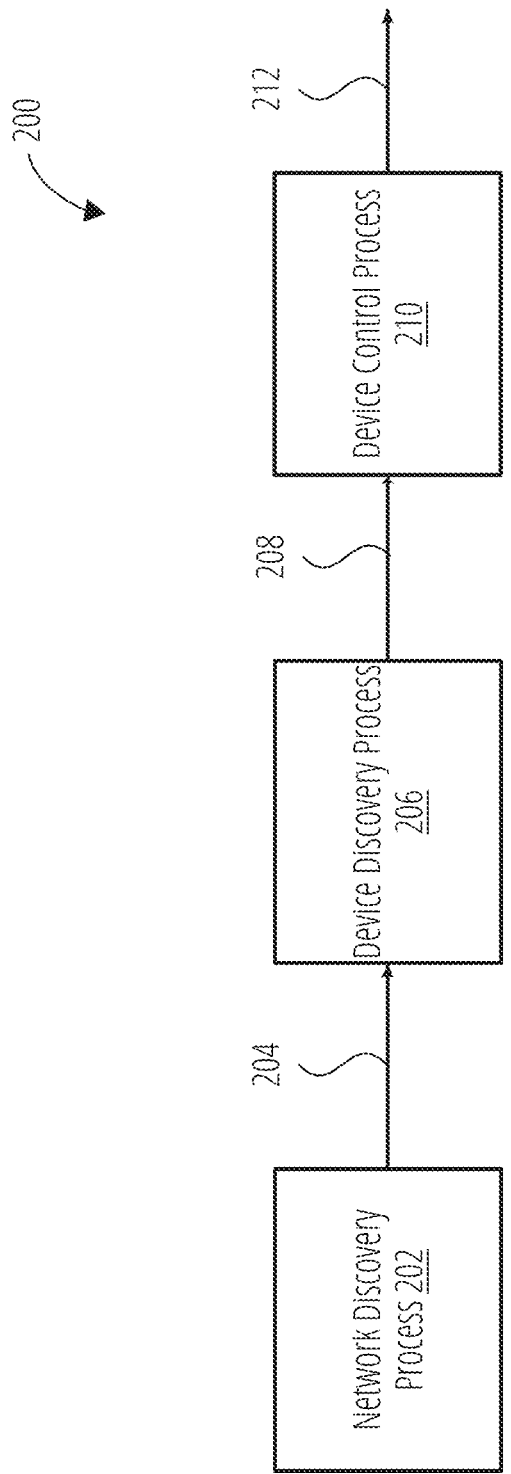
FIG. 2 is a flow diagram of a method with a network discovery process, a device discovery process, and a device control process according to one embodiment.

FIG. 2 is a flow diagram of a method 200 with a network discovery process, a device discovery process, and a device control process according to one embodiment. The method 200 can be performed by processing logic that comprises hardware (e.g., circuitry, dedicated logic, programmable logic, microcode, etc.), software, firmware, or a combination thereof. In one embodiment, the Zigbee controller device 102 of FIG. 1 can perform method 200. In another embodiment, a wearable device can perform method 300. In another embodiment, other wireless devices can perform the method 200.

Referring to FIG. 2, the method 200 begins with the processing logic performing a network discovery process 202. In the network discovery process 202, the processing logic detects one or more Zigbee networks (e.g., 108, 110, etc.). In at least one embodiment, the processing logic sends beacon requests on all of the channels sequentially and waits for beacon responses on each of the channels. The beacon response can identify one or more Zigbee networks in proximity. As part of the network discovery process 202, the processing logic generates a network list table 204, such as the network list table 400 illustrated in FIG. 4. The network list table 204 includes information about each of the Zigbee networks discovered during the network discovery process 202. In at least one embodiment, the processing logic detects the first Zigbee Network 108 and the second Zigbee network 110 by sending beacon requests on a set of channels (e.g., channels 11-26). The processing logic receives beacon responses from one or more devices, the beacon responses identifying a network identifier (e.g., PAN identifier (ID), and a channel identifier (channel ID), for each of the first Zigbee Network 108 and second Zigbee network 110. The processing logic can already store some information about the first Zigbee Network 108 and second Zigbee network 110, such as the network credentials (e.g., a network frame counter, a network key, and/or a link key), and a network name for each of the first Zigbee Network 108 and second Zigbee network 110. The processing logic generates the network list table 204 using data from the beacon responses and the already stored network information. In at least one embodiment, the network list table 204 specifies: i) for the first Zigbee Network 108, the first network identifier, the first channel identifier, a first network frame counter, and the first network key; and ii) for the second Zigbee network 110, the second network identifier, the second channel identifier, a second network frame counter, and the second network key.

After the network discovery process 202, the processing logic performs a device discovery process 206. The processing logic can use the information in the network list table 204 to discover devices. In at least one embodiment, the processing logic sends, on a first channel associated with the first channel identifier, a first request to rejoin the first Zigbee Network 108, the first request being encoded with the first network key. The first request can include the network frame counter. While rejoined as part of the first Zigbee Network 108, the processing logic can detect a first set of one or more devices part of the first Zigbee Network 108. In at least one embodiment, the processing logic broadcasts match descriptor requests to identify devices on the respective Zigbee network that match specified criteria, such as a specified profile identifier and a cluster identifier. The profile identifier can be used to identify a specific category of devices, such as home automation devices. The cluster identifier can be used to identify a specific type of device within the profile (category), such as lightbulbs, door locks, curtains, or the like). Together the profile identifier and cluster identifier can identify devices on the Zigbee networks that are within a certain category of devices and a specific type of device within the category. The processing logic receives responses from those devices with the specified criteria. The processing logic can repeat this for each discovered network in the network list table 204. As part of the device discovery process 206, the processing logic generates a device list table 208, such as the device list table 500 illustrated in FIG. 5. The device list table 208 includes information about each of the Zigbee devices discovered during the device discovery process 206.

In at least one embodiment, the processing logic can determine a subset of devices from the device list table 208, where the subset of devices is located in proximity to a first device with the processing logic. In at least one embodiment, the processing logic can determine a receive signal strength indication (RSSI) value associated with each device of the discovered Zigbee networks. The RSSI value is indicative of a physical distance between the respective device and the first device. The processing logic can identify, from the device list table, the subset of devices having an RSSI value that is greater than a specified threshold that represents a threshold physical distance from the first device. For example, the Zigbee devices located in the same room of the dwelling can have an RSSI value that is greater than the specified threshold.

In another embodiment, the processing logic can determine a subset of devices using group information and location information for the discovered devices. The processing logic can retrieve, from a database, group information and location information for a set of devices.

After the device discovery process 206, the processing logic performs a device control process 210. In the device control process 210, the processing logic generates message(s) 212 in response to a user command to control one or more Zigbee devices in proximity. The processing logic sends the message(s) 212 to one or more Zigbee devices in proximity.

Figure 3:
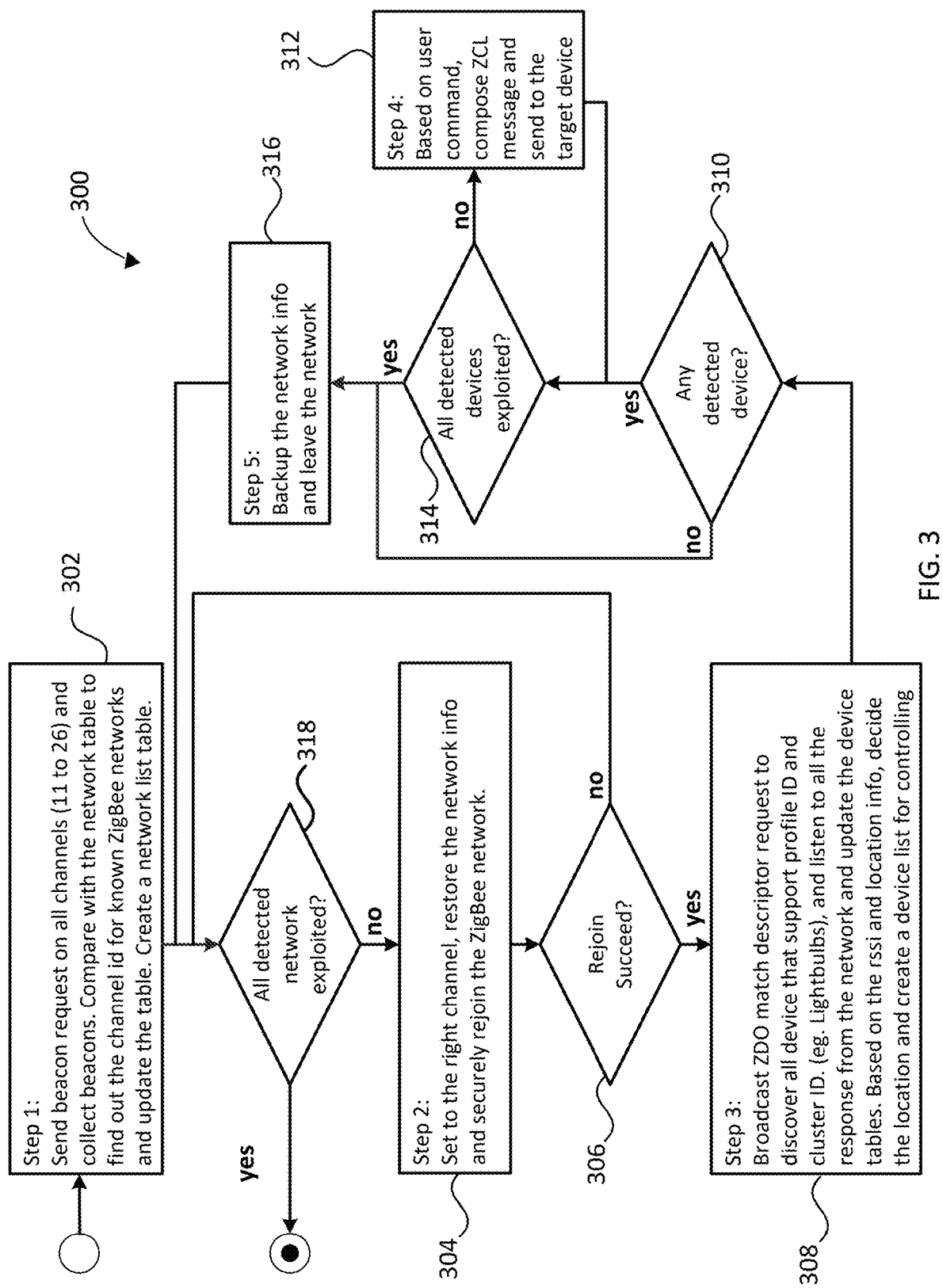
FIG. 3 is a flow diagram of a method for controlling multiple Zigbee devices in multiple Zigbee networks according to at least one embodiment.

FIG. 3 is a flow diagram of a method 300 for controlling multiple Zigbee devices in multiple Zigbee networks according to at least one embodiment. The method 300 can be performed by processing logic that comprises hardware (e.g., circuitry, dedicated logic, programmable logic, microcode, etc.), software, firmware, or a combination thereof. In one embodiment, the Zigbee controller device 102 of FIG. 1 can perform method 300. In another embodiment, a wearable device can perform method 300. In another embodiment, other wireless devices can perform the method 300.

Referring to FIG. 3, the method 300 begins at block 302 with Step 1, for which the Zigbee controller device 102 detects ZigBee networks using beacon requests. The Zigbee controller device 102 (also referred to as a detector) sends out multiple beacon requests on all the ZigBee channels and listens to the beacon responses from surrounding devices. All the ZigBee coordinators and ZigBee routers will respond to the beacon request even if they are not permitted to join. The received beacon response contains important information, such as personal area identifier (PAN ID), extended PAN ID (extend PAN ID), Short ID, joining permission, protocol versions, device type, RSSI value, channel identifier, etc. From this information, Zigbee controller device 102 can find out the available ZigBee networks using the network Pan ID and device short ID, and the responding device's approximate distance according to the RSSI values. After Step 1 at block 302, the full list of Zigbee networks is established, including all the ZCs and ZRs in the Zigbee networks. It should be noted that the ZED detection is completed in Step 2 and Step 3. Based on the collected information and the already known network table, a new network list is generated.

At Step 2 at block 304, the Zigbee controller device 102 will retrieve the pre-stored network information, according to the established network list. The Zigbee controller device 102 will use the pre-stored network information to rejoin the network on the detected channel. The Zigbee standard does not specify the procedure to switch between different Zigbee networks. This requires some rework on the existing Zigbee stack. By default, all the Zigbee stack doesn't support dynamic Zigbee network switching. The network backup and restore feature needs to be implemented to support dynamic network switching. Before secure rejoin, Zigbee controller device 102 needs to restore the previously backed up network key and network frame counter and then start a secure rejoin procedure. The secure rejoin does not require the presence of the ZC. This brings the feasibility of controlling Zigbee devices even when the Zigbee hub is down, where the Zigbee hub is normally the ZC of a Zigbee network.

At Step 3 at block 310, after the secure rejoin succeeds at block 306, the Zigbee controller device 102 can start to discover ZR and ZED on the Zigbee network by sending out the broadcast ZDO message "Match descriptor request." According to the Zigbee standard, this ZDO message will be broadcast in the Zigbee network and be received and responded to by all ZC, ZR, and non-sleepy ZED (radio is always on when idle). In the use case of lightbulb controlling, the profile and cluster identifiers can be used to identify lightbulbs to be controlled. For example, the profile ID: HA=0x0104, and Cluster ID: on-off cluster=0x0006, can be used in the match descriptor requests to find all the ZigBee lights in the network. In response to the match descriptor requests with this profile ID and Cluster ID, these devices will respond with their short ID and endpoint. The "Match descriptor response" will be sent back to the initiator (i.e., the Zigbee controller device 102) through mesh routing. In order to detect the distance between the Zigbee controller device 102 and the remote target, the Zigbee controller device 102 needs to receive and store all the Zigbee messages over the air and find out the original ZDO message sent from the target (not the one forwarded by the Zigbee router) and measure the RSSI value. Based on the RSSI threshold settings, it is easy to filter out the devices that are far away. In one use case, the Zigbee controller device 102 can be configured to control the Zigbee device in the room the user is located; therefore, it is important to calculate the indoor location. As shown in the device list table, the device has already obtained a device database that contains the group info and location info of each device. Therefore, it is straightforward to match the information received with the database table and create a new device list, as shown in FIG. 5. Based on all the information collected, the Zigbee controller device 102 can decide which devices are in the room that can be controlled.

In another embodiment, at Step 3 at block 310, after the secure rejoin succeeds at block 306, the Zigbee controller device 102 can start to discover ZR and ZED on the Zigbee network by sending other types of messages and acknowledgements than match descriptor requests. For example, the Zigbee controller device 102 can send low level protocol signals and acknowledgements to discover the ZR and ZED devices on the Zigbee network.

Sometimes, it is possible that there are Zigbee devices belonging to different networks, so this device detection procedure needs to go through all the detected networks in the network list table to create a complete picture of the devices to be controlled.

If there is no Zigbee response at block 310, it will switch to the next Zigbee network in the network list table and repeat the previous steps until all the networks in the network list table are tried. For each network, all the discovered devices will be put into a device list table and proceed to Step 4.

At Step 4 at block 312, according to the user's command, a specific Zigbee Cluster Library (ZCL) message will be created and sent to the right destination address on the right endpoint to control the remote target. When all devices are controlled at block 314, it will repeat steps 2 to 4 until all the networks are tried. In one embodiment, the Zigbee controller device 102 can back up the network information and leave the network at block 316 before repeating steps 2 to 4 on another network. When all the detected networks have been exploited at block 318, the method 300 ends.

The benefit of this approach is that it is fully compliant with Zigbee specifications (Zigbee HA and Zigbee3.0). It can adapt to the changes of the network on network keys, link keys, channels, devices address, etc. Even when new devices are added, the Zigbee controller device 102 can also detect and control it.

This method 300 allows reliable and quick detection of ZC, ZR, and non-sleepy ZED.

In another embodiment, the processing logic can perform a method of operating a first device to discover and control devices in multiple Zigbee networks. In at least one embodiment, the processing logic begins the method by discovering a first Zigbee network and a second Zigbee network. The processing logic stores a network list table comprising first network data for the first Zigbee network and second network data for the second Zigbee network. The first network data includes a first network identifier, a first channel identifier, a first network frame counter, and a first network key. The second network data includes a second network identifier, a second channel identifier, a second network frame counter, and a second network key. While joined to the first Zigbee network on a first channel associated with the first channel identifier, the processing logic discovers a first set of devices that are part of the first Zigbee network using the first network key. While joined to the second Zigbee network on a second channel associated with the second channel identifier, the processing logic discovers a second set of devices that are part of the second Zigbee network using the second network key. The processing logic stores a device list table including first device data and second device data. The first device data includes, for each of the first set of devices, the first network identifier, the first channel identifier, the first network key, a RSSI value, and a first link key. The second device data includes, for each of the second set of devices, the second network identifier, the second channel identifier, the first network key, an RSSI value, and a second link key. The processing logic determines, from the first and second set of devices, a subset of devices in proximity to the first device using the first device data and the second device data. The processing logic receives a command to control the subset of devices from the devices. The processing logic sends a message to each of the subset of devices. Each message includes the command and the first network frame counter or second network frame counter, and is encoded with a respective network key and a respective link key specified in the first device data or the second device data.

In a further embodiment, the first device data includes group information for each of the first set of devices, and the second device data includes group information for each of the second set of devices. The processing logic determines the subset of devices by identifying, from the first and second device data, the subset of devices having the same group information. In a further embodiment, the processing logic determines the subset of devices by identifying, from the first and second device data, the subset of devices having the same group information and having RSSI values greater than the specified threshold.

In a further embodiment, the processing logic discovers the first set of devices that are part of the first Zigbee network by sending a first request to discover all devices that match specified criteria in the first Zigbee network. The processing logic discovers the second set of devices that are part of the second Zigbee network by sending a second request to discover all devices that match the specified criteria in the second Zigbee network.

FIG. 4 illustrates a network list table 400 according to at least one embodiment. The network list table 400 includes fields/columns for PAN ID 402, extended PAN ID 404, channel ID 406, network frame counter 408, network key 410, link key 412, and network name 414. The network list table 400 includes an entry for each Zigbee network detected in the network discovery process described above. In this embodiment, the network list table 400 includes entries with values in each field/column for the first Zigbee Network 108 and the second Zigbee network 110.

FIG. 5 illustrates a device list table 500 according to at least one embodiment. The device list table 500 includes fields/columns for device identifier 502, short ID 504, group ID 506, location information 508, type 510, end point 512, RSSI value 514, network/link key 516, PAN ID 518, and device name 520. The device list table 500 includes an entry for each Zigbee device detected in the device discovery process described above. In this embodiment, the device list table 500 includes entries with values in each field/column for each device in the first Zigbee Network 108 and the second Zigbee network 110.

Figure 6:
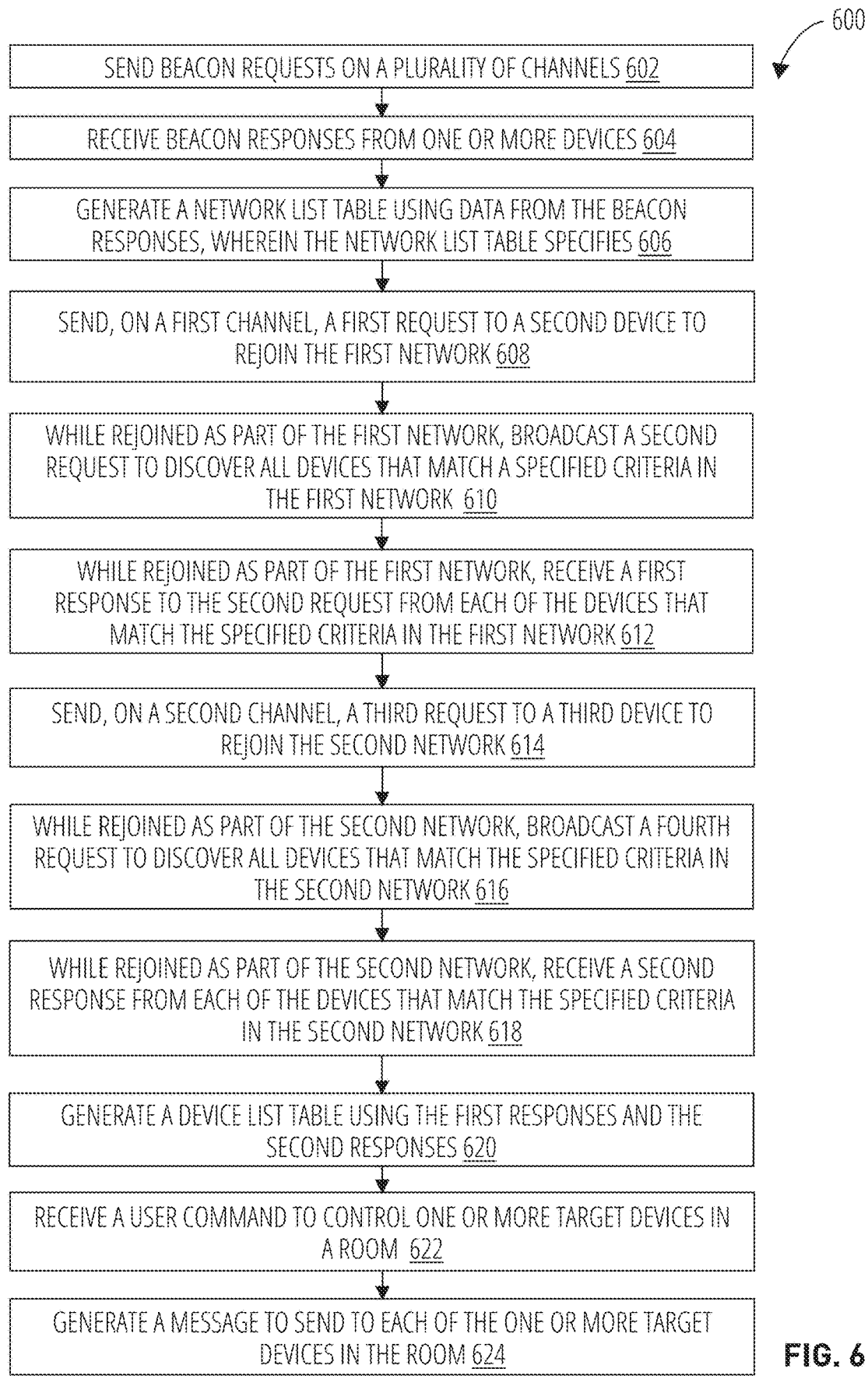
FIG. 6 is a flow diagram of a method for controlling multiple Zigbee devices in multiple Zigbee networks according to at least one embodiment.

FIG. 6 is a flow diagram of a method 600 for controlling multiple Zigbee devices in multiple Zigbee networks according to at least one embodiment. The method 600 can be performed by processing logic that comprises hardware (e.g., circuitry, dedicated logic, programmable logic, microcode, etc.), software, firmware, or a combination thereof. In one embodiment, the Zigbee controller device 102 of FIG. 1 can perform method 300. In another embodiment, a wearable device can perform method 600. In another embodiment, other wireless devices can perform the method 600.

Referring to FIG. 6, the method 600 begins with the processing logic sending beacon requests on a plurality of channels (block 602). At block 604, the processing logic receives beacon responses from one or more devices. At block 606, the processing logic generates a network list table using data from the beacon responses. The network list table specifies i) for a first Zigbee network, a first network identifier, a first channel identifier, a first network frame counter, a first network key, and a first link key, and ii) for a second Zigbee network, a second network identifier, a second channel identifier, a second network frame counter, a second network key, and a second link key.

At block 608, the processing logic sends, on a first channel associated with the first channel identifier, a first request to a second device to rejoin the first Zigbee network. The first request can include the first network frame counter and encoded with the first network key. The second device is part of the first Zigbee network. At block 610, while rejoined as part of the first Zigbee network, the processing logic broadcasts a second request (e.g., match descriptor request) to discover all devices that match specified criteria (e.g., profile ID and cluster ID) in the first Zigbee network. At block 612, while rejoined as part of the first Zigbee network, the processing logic receives a first response (e.g., match descriptor response) to the second request from each of the devices that match the specified criteria in the first Zigbee network.

At block 614, the processing logic sends, on a second channel associated with the second channel identifier, a third request to a third device to rejoin the second Zigbee network. The third request can include the second network frame counter and can be encoded with the second network key. The third device is part of the second Zigbee network. At block 616, while rejoined as part of the second Zigbee network, the processing logic broadcasts a fourth request (e.g., match descriptor request) to discover all devices that match the specified criteria in the second Zigbee network. At block 618, while rejoined as part of the second Zigbee network, the processing logic receives a second response (e.g., match descriptor response) from each of the devices that match the specified criteria in the second Zigbee network. At block 620, the processing logic generates a device list table using the first responses and the second responses. The device list table can specify for each of the devices that match the specified criteria a device identifier, the first network key or the second network key, and the first link key or the second link key. At block 622, the processing logic receives a user command to control one or more target devices in a room. At block 624, the processing logic generates a message to send to each of the one or more target devices in the room. The message can include the respective device identifier and the user command encoded by a respective network key and a respective link key specified in the device list table. At block 626, the processing logic sends the message to each of the one or more target devices in the room.

In a further embodiment, while rejoined as part of the first Zigbee network, the processing logic determines an RSSI value associated with each of the devices that match the specified criteria in the first Zigbee network, the RSSI value being indicative of a physical distance between the first device and a device sending the respective first response to the first request. While rejoined as part of the second Zigbee network, the processing logic determines an RSSI value associated with each of the devices that match the specified criteria in the second Zigbee network, the RSSI value being indicative of a physical distance between the first device and a device sending the respective second response to the first request. The processing logic identifies, from the device list table, the one or more target devices in the room as having an RSSI value that is greater than a specified threshold that represents a threshold physical distance from the first device.

In a further embodiment, the device list table further specifies group information and room information for each of the devices. The processing logic determines the room in which the first device is located using the RSSI values of devices having the same room information.

Figure 7:
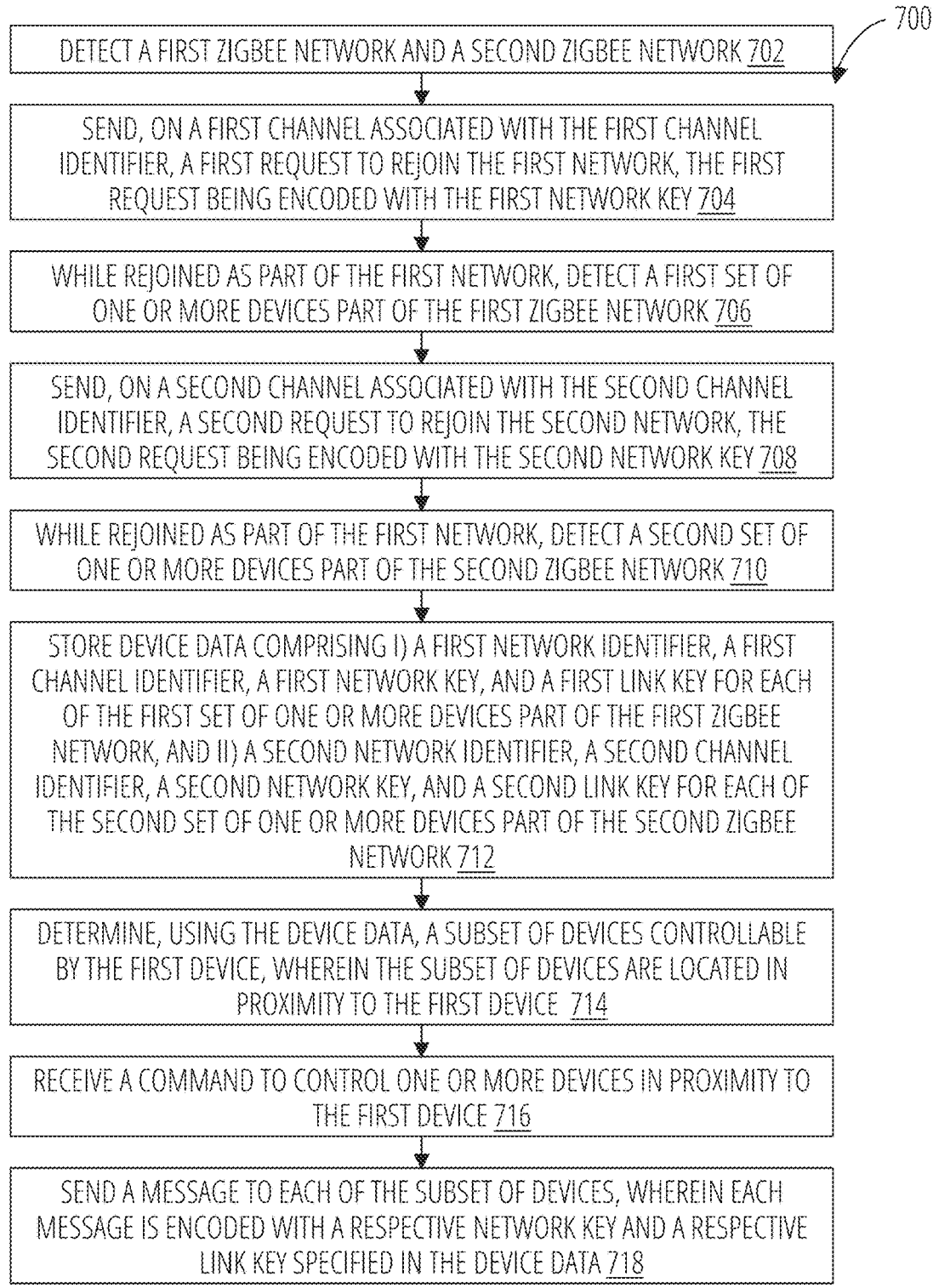
FIG. 7 is a flow diagram of a method for controlling multiple Zigbee devices in multiple Zigbee networks according to at least one embodiment.

FIG. 7 is a flow diagram of a method 700 for controlling multiple Zigbee devices in multiple Zigbee networks according to at least one embodiment. The method 700 can be performed by processing logic that comprises hardware (e.g., circuitry, dedicated logic, programmable logic, microcode, etc.), software, firmware, or a combination thereof. In one embodiment, the Zigbee controller device 102 of FIG. 1 can perform method 300. In another embodiment, a wearable device can perform method 700. In another embodiment, other wireless devices can perform the method 700.

Referring to FIG. 7, the method 700 begins with the processing logic detecting a first Zigbee network and a second Zigbee network (block 702). At block 704, the processing logic sends, on a first channel associated with the first channel identifier, a first request to rejoin the first Zigbee network, the first request being encoded with the first network key. At block 706, while rejoined as part of the first Zigbee network, processing logic detects a first set of one or more devices part of the first Zigbee network. At block 708, the processing logic sends, on a second channel associated with the second channel identifier, a second request to rejoin the second Zigbee network, the second request being encoded with the second network key. At block 710, while rejoined as part of the first Zigbee network, the processing logic detects a second set of one or more devices part of the second Zigbee network. At block 712, the processing logic stores device data, including i) a first network identifier, a first channel identifier, a first network key, and a first link key for each of the first set of one or more devices part of the first Zigbee network, and ii) a second network identifier, a second channel identifier, a second network key, and a second link key for each of the second set of one or more devices part of the second Zigbee network. At block 714, the processing logic determines, using the device data, a subset of devices controllable by the first device. The subset of devices is located in proximity to the first device. At block 716, the processing logic receives a command to control one or more devices in proximity to the first device. At block 718, the processing logic sends a message to each device of the subset of devices. Each message can be encoded with a respective network key and a respective link key specified in the device data.

In a further embodiment, to determine the subset of devices, the processing logic determines an RSSI value associated with each device of the first set and second set, the RSSI value being indicative of a physical distance between the device and the first device. The processing logic identifies, from the device list table, the subset of devices having an RSSI value that is greater than a specified threshold that represents a threshold physical distance from the first device.

In a further embodiment, to detect the first Zigbee network and the second Zigbee network, the processing logic sends beacon requests on a set of channels and receives beacon responses from one or more devices. The processing logic generates a network list table using data from the beacon responses. In at least one embodiment, the network list table specifies: i) for the first Zigbee network, the first network identifier, the first channel identifier, a first network frame counter, and the first network key; and ii) for the second Zigbee network, the second network identifier, the second channel identifier, a second network frame counter, and the second network key. In at least one embodiment, the first request includes the first network frame counter, and the second request includes the second network frame counter.

In a further embodiment, to detect the first set of one or more devices part of the first Zigbee network, the processing logic broadcasts a third request to discover all devices that match specified criteria in the first Zigbee network. To detect the second set of one or more devices part of the second Zigbee network, the processing logic broadcasts a fourth request to discover all devices that match the specified criteria in the second Zigbee network. In at least one embodiment, the specified criteria include a profile identifier and a cluster identifier.

In a further embodiment, the processing logic receives a response from each of the devices that match the specified criteria in the first Zigbee network in response to the third request, the response comprising the first link key. The processing logic receives a response from each of the devices that match the specified criteria in the second Zigbee network in response to the fourth request, the response comprising the second link key. The processing logic generates a device list table including the device data using the responses to the third and fourth requests. The device list table can specify for each of the devices that match the specified criteria a device identifier, the first network key or the second network key, and the first link key or the second link key.

In a further embodiment, the processing logic retrieves, from a database, group information and location information for a set of devices. The device data can further include the database group information and location information for each of the first set and second set. The processing logic determines the subset of devices using the group information and the location information.

As described herein, the processing logic can be part of a first device, such as a wearable device, and the devices can be a ZC, a ZR, or a ZED, as described herein.

Figure 8:
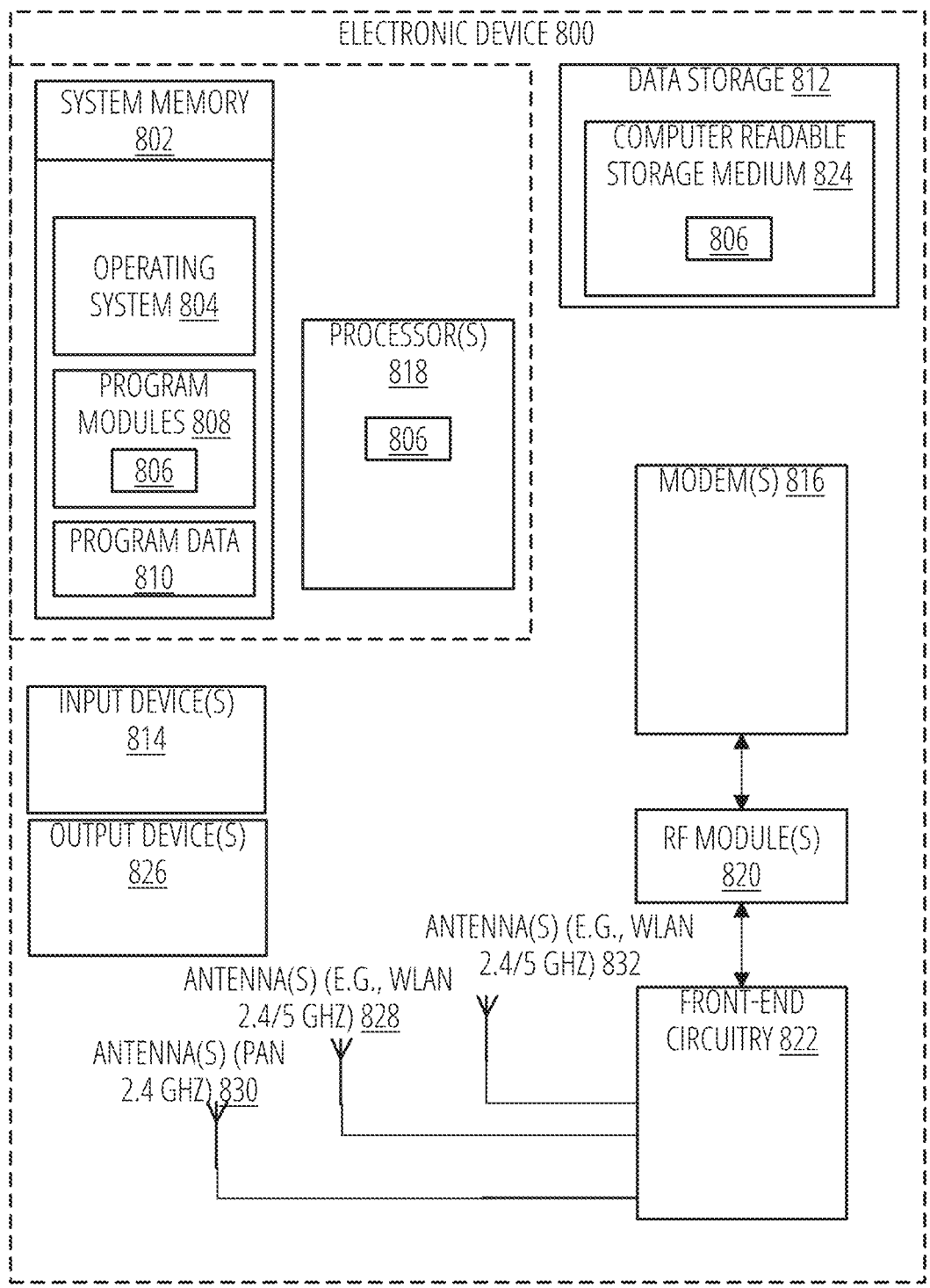
FIG. 8 is a block diagram of an electronic device with a Zigbee controller according to one embodiment.

FIG. 8 is a block diagram of an electronic device 800 with a Zigbee controller 806, according to one embodiment. The Zigbee controller 806 can be software executed by the electronic device 800 to perform the operations of the Zigbee controller device 102 as described herein. The electronic device 800 may correspond to any of the nodes or devices described above with respect to FIG. 1 to FIG. 6. Alternatively, the electronic device 800 may be other electronic devices, as described herein.

The electronic device 800 includes one or more processor(s) 818, such as one or more central processing units (CPUs), microcontrollers, field-programmable gate arrays, or other types of processing devices. The electronic device 800 also includes system memory 802, which may correspond to any combination of volatile and/or non-volatile storage mechanisms (e.g., one or more memory devices). The system memory 802 stores information that provides operating system 804, various program modules 808, program data 810, and/or other components. In one embodiment, the system memory 802 stores instructions of methods to control the operation of the electronic device 800. The electronic device 800 performs functions by using the processor(s) 818 to execute instructions provided by the system memory 802. In one embodiment, the program modules 808 may include the Zigbee controller 806 described herein.

In at least one embodiment, a processing device is operatively coupled to a memory device that stores instructions. The processing device executes instructions to perform various operations, including: sending beacon requests on a plurality of channels; receiving beacon responses from one or more devices; generating a network list table using data from the beacon responses, where the network list table specifies i) for a first Zigbee network, a first network identifier, a first channel identifier, a first network frame counter, a first network key, and a first link key, and ii) for a second Zigbee network, a second network identifier, a second channel identifier, a second network frame counter, a second network key, and a second link key; sending, on a first channel associated with the first channel identifier, a first request to a second device to rejoin the first Zigbee network, the first request includes the first network frame counter and being encoded with the first network key, where the second device is part of the first Zigbee network. While rejoined as part of the first Zigbee network, the operations further include: broadcasting a second request to discover all devices that match a specified criteria in the first Zigbee network; while rejoined as part of the first Zigbee network, receiving a first response to the second request from each of the devices that match the specified criteria in the first Zigbee network; sending, on a second channel associated with the second channel identifier, a third request to a third device to rejoin the second Zigbee network, the third request includes the second network frame counter and being encoded with the second network key, where the third device is part of the second Zigbee network; broadcasting a fourth request to discover all devices that match the specified criteria in the second Zigbee network; while rejoined as part of the second Zigbee network, receiving a second response from each of the devices that match the specified criteria in the second Zigbee network; generating a device list table using the first responses and the second responses, where the device list table specifies for each of the devices that match the specified criteria a device identifier, the first network key or the second network key, and the first link key or the second link key; receiving a user command to control one or more target devices in a room; generating a message to send to each of the one or more target devices in the room, where the message includes the respective device identifier and the user command encoded by a respective network key and a respective link key specified in the device list table; and sending the message to each of the one or more target devices in the room.

The electronic device 800 also includes a data storage device 812 that may be composed of one or more types of removable storage and/or one or more types of non-removable storage. The data storage device 812 includes a computer-readable storage medium 824, on which is stored one or more sets of instructions embodying any of the methodologies or functions described herein. Instructions for the program modules 808 (e.g., Zigbee controller 806) may reside, completely or at least partially, within the computer-readable storage medium 824, system memory 802, and/or within the processor(s) 818 during execution thereof by the electronic device 800, the system memory 802 and the processor(s) 818 also constituting computer-readable media. The electronic device 800 may also include one or more input devices 814 (keyboard, mouse device, specialized selection keys, etc.) and one or more output devices 826 (displays, printers, audio output mechanisms, etc.).

The electronic device 800 further includes a modem 816 to allow the electronic device 800 to communicate via wireless connections (e.g., such as provided by the wireless communication system) with other computing devices, such as remote computers, an item providing system, and so forth. The modem 816 can be connected to one or more radio frequency (RF) modules 820. The RF modules 820 may be a wireless local area network (WLAN) module, a Wide Area Network (WAN) module, a PAN module, Global Positioning System (GPS) module, or the like. The antenna structures (antenna(s) 828, 830, 832) are coupled to the RF circuitry 822, which is coupled to the modem 816. The RF circuitry 822 may include radio front-end circuitry, antenna-switching circuitry, impedance matching circuitry, or the like. The antennas 828, 830, 832 may be GPS antennas, Near Field Communications (NFC) antennas, other WAN antennas, WLAN or PAN antennas, or the like. The modem 816 allows the electronic device 800 to handle both voice and non-voice communications (such as communications for text messages, multimedia messages, media downloads, web browsing, etc.) with a wireless communication system. The modem 816 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 816 may generate signals and send these signals to the antenna(s) 828 of a first type (e.g., WLAN 2.4/5 GHZ), antenna(s) 830 of a second type (e.g., PAN), and/or antenna(s) 832 of a third type (e.g., WLAN 2.4/5 GHZ), via RF circuitry 822, and RF module(s) 820 as described herein. Antennas 828, 830, 832 may be configured to transmit in different frequency bands and/or using different wireless communication protocols. The antennas 828, 830, 832 may be directional, omnidirectional, or non-directional antennas. In addition to sending data, antennas 828, 830, 832, may also receive data, which is sent to appropriate RF modules connected to the antennas. One of the antennas 828, 830, 832 may be any combination of the antenna structures described herein.

In one embodiment, the electronic device 800 establishes a first connection using a first wireless communication protocol, and a second connection using a different wireless communication protocol. The first wireless connection and second wireless connection may be active concurrently, for example, if a network hardware device is receiving a media item from another network hardware device via the first connection and transferring a file to another user device via the second connection at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 816 is shown to control transmission and reception via the antenna (828, 830, 832), the electronic device 800 may alternatively include multiple modems, each of which is configured to transmit/receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as an environment of limited connectivity to broadband Internet infrastructure. The embodiments described herein may be implemented where there is a lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes capable of forwarding broadband mesh traffic to the Internet. The mesh network architecture may include a limited number of point-of-presence (POP) nodes that do have access to the Internet, but the majority of mesh network devices are capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical, or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments where there is limited broadband Internet infrastructure. The embodiments described herein may provide users in these environments with a content delivery experience that is equivalent to what the users would receive on a traditional broadband Internet connection. The embodiments described herein may be used to optimize deployment for traffic types (e.g., streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of operating a first an electronic device, the method comprising:
   detecting a first Zigbee network and a second Zigbee network;
   joining the first Zigbee network on a first channel using a first network key;
      upon joining the first Zigbee network, detecting a first set of devices that are part of the first Zigbee network;
   joining the second Zigbee network on a second channel using a second network key;
   upon joining the second Zigbee network, detecting a second set of devices that are part of the second Zigbee network;
   storing first device data for each of the first set of devices, the first device data for each of the first set of devices comprising a first network identifier, a first channel identifier associated with the first channel, the first network key, and a first link key;
   storing second device data for each of the second set of devices, the second device data for each of the second set of devices comprising a second network identifier, a second channel identifier associated with the second channel, the second network key, and a second link key;
   determining, using the first and second device data, a subset of devices from the first set and second set of devices controllable by the electronic device; and
   receiving a command to control the subset of devices; and
      sending a message to each of the subset of devices, wherein each message comprises the command and is encoded with a respective network key and a respective link key specified in the first device data or the second device data.

2. The method of claim 1, wherein:
the first device data comprises group information for each of the first set of devices;
the second device data comprises group information for each of the second set of devices; and
determining the subset of devices comprises identifying, from the first and second device data, the subset of devices having the same group information.

3. The method of claim 1, wherein determining the subset of devices comprises:
determining a receive signal strength indication (RSSI) value associated with each device of the first set and second set of devices, the RSSI value being indicative of a physical distance between the respective device and the electronic device; and
identifying, from the first and second device data, the subset of devices having an RSSI value that is greater than a specified threshold, wherein the specified threshold represents a threshold physical distance from the electronic device.

4. The method of claim 1, wherein:
detecting the first Zigbee network and the second Zigbee network comprises:
sending beacon requests on a plurality of channels;
receiving beacon responses from the first set and second set of devices;
generating a network list table using data from the beacon responses, wherein the network list table specifies:
i) for the first Zigbee network: the first network identifier, the first channel identifier, a first network frame counter, and the first network key; and
ii) for the second Zigbee network: the second network identifier, the second channel identifier, a second network frame counter, and the second network key,
the electronic device joins the first Zigbee network using the first network key; and
the electronic device joins the second Zigbee network using the second network key.

5. The method of claim 1, wherein:
detecting the first set of devices comprises broadcasting a first request over the first Zigbee network, the first request including first criteria, and receiving a first response to the first request from one or more devices that match the first criteria; and
detecting the second set of devices part of the second Zigbee network comprises broadcasting a second request to discover all devices that match second criteria in the second Zigbee network, and receiving a second response to the second request from one or more devices that match the second criteria.

6. The method of claim 5, wherein the first and the second criteria comprise a profile identifier and a cluster identifier.

7. The method of claim 5, further comprising:
receiving the first response from a first device that matches the first criteria, the first response comprising the first link key;
receiving the second response from a second device that matches the second criteria, the second response comprising the second link key; and
generating, using the first and second responses, a table comprising the first and second device data, wherein the table specifies for the first device and the second device: a respective device identifier, the first network key or the second network key, and the first link key or the second link key.

8. The method of claim 3, further comprising:
retrieving, from a database, group information for the first and second sets of devices, wherein:
the first device data comprises the group information for each of the first set of devices;
the second device data comprises the group information for each of the second set of devices; and
determining the subset of devices further comprises using the group information.

9. The method of claim 1, wherein the subset of devices comprises at least one of a Zigbee coordinator, a Zigbee router, or a Zigbee end device.

10. An electronic device comprising:
a memory device that stores instructions; and
a processing device, operatively coupled to the memory device, that executes the instructions to perform operations comprising:
detect a first Zigbee network and a second Zigbee network;
join the first Zigbee network on a first channel using a first network key;
upon joining the first Zigbee network, detect a first set of devices that are part of the first Zigbee network;
join the second Zigbee network on a second channel using a second network key;
upon joining the second Zigbee network, detect a second set of devices that are part of the second Zigbee network;
store first device data for each of the first set of devices, the first device data for each of the first set of devices comprising a first network identifier, a first channel identifier, the first network key, and a first link key;
store second device data for each of the second set of devices, the second device data for each of the second set of devices comprising a second network identifier, a second channel identifier, the second network key, and a second link key;
determine, using the first and second device data, a subset of devices from the first set and second set of devices controllable by the electronic device; and
receive a command to control the first set and second set of devices; and
send a message to each of the subset of devices, wherein each message comprises the command and is encoded with a respective network key and a respective link key specified in the first device data or the second device data.

11. The electronic device of claim 10, wherein:
the first device data comprises group information for each of the first set of devices;
the second device data comprises group information for each of the second set of devices; and
to determine the subset of devices, the processing device is to identify, from the first and second device data, the subset of devices having the same group information.

12. The electronic device of claim 10, wherein, to determine the subset of devices, the processing device is to perform operations further comprising:
determine a receive signal strength indication (RSSI) value associated with each device of the first set and second set of devices, the RSSI value being indicative of a physical distance between the respective device and the electronic device; and
identify, from the first and second device data, the subset of devices having an RSSI value that is greater than a specified threshold, wherein the specified threshold represents a threshold physical distance from the electronic device.

13. The electronic device of claim 10, wherein:
to detect the first Zigbee network and the second Zigbee network, the processing device is to perform operations further comprising:
send beacon requests on a plurality of channels;
receive beacon responses from the first set and the second set of devices;
generate a network list table using data from the beacon responses, wherein the network list table specifies:
  i) for the first Zigbee network: the first network identifier, the first channel identifier, a first network frame counter, and the first network key; and
  ii) for the second Zigbee network: the second network identifier, the second channel identifier, a second network frame counter, and the second network key,
the processing device joins the first Zigbee network using the first network key and
the processing device joins the second Zigbee network using the second network key.

14. The electronic device of claim 10, wherein:
to detect the first set of devices, the processing device is to broadcast a first request over the first Zigbee network, the first request including first criteria, and receive a first response to the first request from one or more devices that match the first criteria; and
to detect the second set of devices, the processing device is to broadcast a second request over the second Zigbee network, the second request including second criteria, and receive a second response from one or more devices that match the second criteria.

15. The electronic device of claim 14, wherein the first criteria and the second criteria comprise a profile identifier and a cluster identifier.

16. The electronic device of claim 14, wherein the operations further comprise:
receive the first response from a first device that matches the first criteria, the first response comprising the first link key;
receive the second response from a second devices that matches the second criteria, the second response comprising the second link key; and
generate, using the first and second responses, a table comprising the first and second device data, wherein the table specifies for the first device and the second device: a respective device identifier, the first network key or the second network key, and the first link key or the second link key.

17. The electronic device of claim 12, wherein:
the operations further comprise retrieve, from a database, group information for the first and second sets of devices;
the first device data comprises the group information for each of the first set of devices;
the second device data comprises the group information for each of the second set of devices; and
determine the subset of devices further comprises using the group information.

18. A method of operating an electronic device to discover and control devices in a plurality of Zigbee networks, the method comprising:
discovering a first Zigbee network and a second Zigbee network;
storing a network list table comprising first network data for the first Zigbee network and second network data for the second Zigbee network, wherein the first network data comprises a first network identifier, a first channel identifier, a first network frame counter, and a first network key, wherein the second network data comprising a second network identifier, a second channel identifier, a second network frame counter, and a second network key;
joining the first Zigbee network on a first channel using the first network key;
while joined to the first Zigbee network on a first channel associated with the first channel identifier, discovering a first set of devices that are part of the first Zigbee network using the first network key;
joining the second Zigbee network on a second channel using the second network key;
while joined to the second Zigbee network on a second channel associated with the second channel identifier, discovering a second set of devices that are part of the second Zigbee network using the second network key;
storing a device list table comprising first device data for each of the first set of devices and second device data for each of the second set of devices, wherein the first device data for each of the first set of devices comprises the first network identifier, the first channel identifier, the first network key, a Receive Signal Strength Indicator (RSSI) value, and a first link key, and wherein the second device data for each of the second set of devices comprises the second network identifier, the second channel identifier, the first network key, an RSSI value, and a second link key;
determining, from the first and second sets of devices, a subset of devices in proximity to the electronic device using the first device data and the second device data;
receiving a command to control the subset of devices from the devices; and
sending a message to each of the subset of devices from the devices, wherein each message comprises the command and the first network frame counter or the second network frame counter, and is encoded with a respective network key and a respective link key specified in the first device data or the second device data.

19. The method of claim 18, wherein:
the first device data comprises group information for each of the first set of devices;
the second device data comprises group information for each of the second set of devices; and
determining the subset of devices from the devices comprises identifying, from the first and second device data, the subset of devices from the devices having the same group information.

20. The method of claim 18, wherein:
discovering the first set of devices that are part of the first Zigbee network comprises sending a first request to discover all devices that match specified criteria in the first Zigbee network; and
discovering the second set of devices that are part of the second Zigbee network comprises sending a second request to discover all devices that match the specified criteria in the second Zigbee network.

* * * * *